United States Patent [19]

Baird

[11] Patent Number: 4,948,362

[45] Date of Patent: Aug. 14, 1990

[54] ENERGY CONSERVING PROCESS FOR CALCINING CLAY

[75] Inventor: David P. Baird, Macon, Ga.

[73] Assignee: Georgia Kaolin Company, Inc., Union, N.J.

[21] Appl. No.: 270,176

[22] Filed: Nov. 14, 1988

[51] Int. Cl.$^5$ .................. F27B 15/02; F27D 17/00
[52] U.S. Cl. ........................ 432/14; 432/72; 110/254
[58] Field of Search ............ 432/14, 106, 96, 176, 432/72; 110/234, 254; 106/484, 486, 100; 501/145, 150

[56] References Cited

U.S. PATENT DOCUMENTS

| | | | |
|---|---|---|---|
| 3,523,407 | 3/1968 | Humbert | 432/72 |
| 4,198,273 | 4/1980 | Dudek et al. | 432/106 |
| 4,223,640 | 9/1980 | Rochford et al. | 110/254 |
| 4,573,418 | 3/1986 | Märzendorfer et al. | 110/254 |
| 4,662,841 | 5/1987 | Zeisel | 432/96 |
| 4,717,559 | 1/1988 | Cummings et al. | 423/328 |
| 4,760,650 | 8/1988 | Theliander et al. | 110/234 |

Primary Examiner—Henry A. Bennet
Assistant Examiner—C. Kilner
Attorney, Agent, or Firm—William W. Habelt

[57] ABSTRACT

The present invention provides an energy conserving process for calcining a clay and apparatus for carrying out the process. A dry pulverized clay powder (1) is fed to a calciner (20) to be calcined therein. The calcined clay product (3) is removed from the calciner (20) and preferably passed in heat exchange relationship with a cooling medium (71) whereby the calcined clay product (3) is cooled and the cooling medium is heated. The hot off-gas (7) discharged from the calciner (20) is passed through an electrostatic precipitator (30) to remove at least a substantial portion of calcined clay product dust (11) entrained in the exhaust gas from the calciner. The clean gas (13) leaving the electrostatic precipitator (30) is passed in heat exchange relationship with a cooling fluid (51) to further cool the gas, and preferably to evaporate at least a portion of the cooling portion to produce a heating vapor (53). In order to improve the dust collection efficiency of the electrostatic precipitator (30), the moisture content of the calciner exhaust gas passing through the electrostatic precipitator (30) should be controlled at a level of at least 12% by volume of the gas. Preferably, the recovered hot calcined clay dust (11) recovered in the electrostatic precipitator (30) is mixed with the clay feed material (1) being supplied to the calciner (20) without substantially cooling the hot calcined clay powder collected in the electrostatic precipitator (30).

18 Claims, 5 Drawing Sheets

ENERGY CONSERVING PROCESS FOR CALCINING CLAY

The present invention relates generally to the processing of kaolin clay to produce calcined, anhydrous kaolin products in particulate form which are suitable for commercial use. More specifically, the invention relates to a process and apparatus wherein at least a portion of the energy in the hot off-gases from the calcirer is recovered and used in the clay processing. Additionally, the invention relates to a process and system in which the product calcined kaolin from the calciner is cooled and the kaolin clay feed to the calciner is preheated in an energy efficient manner.

Calcined kaolin pigments have many known applications in industry. They are particularly useful as fillers in or for coating of paper and paper board products. Additionally, calcined kaolin pigments are widely used in industry as fillers in paints, rubbers, and plastics. Typically, crude kaolin clay contains various impurities which cause discoloration and it is also typically too abrasive for direct use in commercial products. Therefor, it is necessary beneficiate the crude kaolin prior by various well-known commercial processes which increase the brightness of the clay by removing discoloration impurities and decrease the abrasiveness by reducing the particle size of the kaolin particles.

In general, the crude kaolin clay is beneficiated by wet processing. Such wet processing requires that the clay be processed at low solids in an aqueous slurry form. Therefor, it is necessary to add substantial amounts of water to the dry crude kaolin to form a clay suspension or slurry having a low solids content, typically in the range of 15% to 40% by weight. However, the clay being fed to the calciner must be in a dry particulate state. Therefor, the water added to the crude kaolin prior to wet processing must be removed therefrom prior to feeding the beneficiated kaolin to the calciner.

The particular wet processing procedure followed in beneficiating the kaolin clay is not germane to this invention. In the conventional wet processing for producing beneficiated kaolin clay, the crude clay is first pulverized and then blunged in water with a dispersing agent to form a clay-in-water suspension or slurry. After degriting and fractionation, typically on a centrifuge, to recover a desired particle size fraction typically by removing nearly all particles larger than 2 microns e.s.d. (equivalent spherical diameter), the fine particle fraction is diluted with water to provide the low solids content. The suspension has been typically treated with a bleaching compound containing a reducing agent, such as the dithionite ion or other known reducing agent, to reduce ferric ions in the clay to the ferrous state. If desired, the kaolin clay may be further beneficiated by flotation benefication according to well known procedures prior to or coincident with bleaching. After the fine clay fraction has been reacted with the bleaching agent, the bleached clay fraction is then filtered, rinsed to provide a dried particulate solid for supply to the calciner.

To dewater a beneficiated clay slurry, the low-solids slurry is typically first passed to a vacuum or press type filter wherein a limited portion of the water is removed from the slurry. Typically, the filter cake from the filter would have a solids content of about 50 to 60% by weight. Thus the slurry would still comprise about 40 to 50% water. Further dewatering on a vacuum or press type filter is impractical due to the fine particle size of the solids in the beneficiated clay slurry. Therefor, to further dewater the beneficiated clay slurry, the partially dewatered slurry is heated by being brought into heat exchange relationship with a hot heating medium to raise the temperature of the clay slurry to a sufficient level to evaporate the remaining water therefrom.

One method commonly utilized in the industry for evaporatively drying the kaolin clay slurry is to pass the kaolin clay slurry through a spray dryer or other direct contact-type evaporator, such as a gas fired kiln, wherein the clay slurry is contacted with a hot drying medium having a temperature of 1000° F. or more, such as hot air or hot flue gas typically generated from the combustion of natural gas. In such a process, the kaolin clay particles are directly contacted with the hot drying gas as the kaolin slurry passes in direct contact heat exchange relationship, typically in a counterflow manner, with the hot drying gas. The dry kaolin clay particles produced in the spray dryer must be pulverized to −200 mesh or finer before being calcined in order to eliminate lumps or agglomerates of clay that may have formed in the spray drying process so as to ensure that the calcined product has the uniform desired properties. For further discussion of the general techniques conventionally utilized in preparing kaolin clay for calcining reference may be had to a number of prior art patents including, for example, Proctor, U.S. Pat. No. 3,014,836; Fanslow et al., U.S. Pat. No. 3,586,523; Witley et al., U.S. Pat. No. 3,798,044; Mixon, Jr., U.S. Pat. No. 4,246,039; McConnell, U.S. Pat. No. 4,381,948 and Cummings et al., U.S. Pat. No. 4,717,559. Each of these prior art patents also provides a discussion of the particular calcination process practiced in the particular process therein disclosed. It is to be understood that any of the wet processing techniques disclosed in any of these references or known in the art are to be encompassed in the termed "wet-processing" as utilized herein.

Two of the aforementioned patents also disclose methods of at least partially recovering waste heat from the hot off-gases from the spray dryer to achieve savings in energy. Mixon, Jr., U.S. Pat. No. 4,246,039 discloses a calcination process wherein the wet processed kaolin is first partially dewatered in an electrically augmented vacuum filter prior to spray drying with the low solids kaolin slurry fed to the vacuum filter being preheated by direct heat exchange in a wet scrubber with hot off-gas from the clay calciner. The exhaust gas from the clay calciner is said to be typically in the range of 800° to 1000° F., while the low solid slurry being fed to the vacuum filter is heated from an amient temperature to a temperature above 100° F., preferably, to a maximum temperature below the boiling point and sufficient to evaporate some water, for example, to increase solids from 2 to 5%, weight basis, prior to introduction of the slurry to the vacuum filter. This patent discloses that such a wet scrubber utilizing hot off-gas from calciner has been used to heat 36% to 38% solids clay slurry from ambient temperature to 125° to 145° F. using off-gases from a calciner having a temperature of about 900° F. Additionally, this patents cites that the clay particulates entrained in the off-gas from the calcining kiln are recovered in the wet scrubber and subsequently supplied to the vacuum filter with the clay slurry leaving the wet scrubber.

U.S. Pat. No. 4,717,559, discloses a process and equipment for calcining a wet processed kaolin wherein the calciner is integrated with a preceding spray dryer by cycling the dust-laden calciner hot off-gas to the spray dryer as the drying medium for contacting with the wet clay in the spray dryer to achieve savings in energy. Additionally, the fine clay particulates entrained in the off-gas from the calciner are recovered as the hot off-gas from the calciner passes through the spray dryer or as the exhaust from the spray dryer is passed through a downstream fabric filter prior to being vented to the atmosphere. In this patent, it is said that by passing exhaust gas from the calciner into the spray dryer and joining it with the hot gas stream being supplied to the spray dryer from the fossil fuel combustor, fuel savings can be achieved at least as high as 40 to 50%.

In any of the aformentioned processes for calcining kaolin clay or in any conventional processes presently in commercial use, the off-gas from the calciner will contain fine particulate kaolin entrained in the exhaust gas. In order to meet governmental particulate emission standards for gases omitted to the atmosphere, it is conventional practice to pass the off-gas from the calciner through a wet scrubber which takes out the particulate kaolin prior to venting the gas to the atmosphere. Although such wet scrubbers are very efficient in cleaning the gas, the calcined kaolin clay particles removed from the exhaust gas are collected as solids suspended in a very dilute aqueous suspension. Although it would be desirable to recover this waste product, and although the suspension could theoretically be filtered and the recovered calcined kaolin clay particles dried, such filtering and drying would be uneconomical in commercial practice. Therefor, it is conventional to pass this dilute product containing suspension to waste.

Although, it would be desirable to recover the calcined kaolin dust entrained in the hot off-gas from the calciner as a dry particulate, conventional fabric filter dust collectors are generally not utilized to directly remove the calcined kaolin dust from hot exhaust gas as conventional fabric used in such collectors can not withstand the high temperatures which would generally be experienced in filtering the hot off-gases which typically exit the calciner at about 1000° F. Cummings et al., U.S. Pat. No. 4,717,559, however, does disclose utilizing such a fabric filter to collect and recover the kaolin clay dust from the calciner exhaust after the calciner exhaust gas has been cooled to a substantially lower temperature by utilizing that exhaust gas as the drying medium contacted with the wet kaolin clay in the spray dryer prior to calcination. Heretofore, it has been generally thought that electrostatic precipitators were not suitable for use in removing the fine kaolin dust in the hot off-gases from the kaolin calciner even though the use of an electrostatic precipitator would permit collection of the fine kaolin clay dust as a dry powder.

Accordingly, it is an object of the present invention to provide a process and system for calcining clay, particularly kaolin clay, wherein waste heat is recovered from the hot off-gases exhausted from the calciner and utilized in the clay processing and wherein the fine calcined clay product entrained as dust in the hot off-gases from the calciner is recovered as a dry powder.

It is a further object of the present invention to provide a process and system for calcining clay, particularly kaolin clay, wherein waste heat is recovered by cooling the calcined product and wherein the clay fed to the calciner is preheated by waste heat recovered from the calcining process.

SUMMARY OF THE INVENTION

The present invention provides an energy conserving process for calcining a clay and apparatus for carrying out the process. In accordance with the process aspect of the present invention, a dry pulverized clay powder is fed to a calciner to be calcined therein. The clay powder feed is passed through the calciner in direct heat exchange contact with a hot gas passing therethrough to heat the clay powder sufficiently to calcine substantially all the clay powder while passing through the calciner. The calcined clay product is removed from the calciner and preferably passed in heat exchange relationship with a cooling medium whereby the calcined clay product is cooled and the cooling medium is heated. The hot off-gas discharged from the calciner is passed through an electrostatic precipitator to remove at least a substantial portion of calcined clay product dust entrained in the exhaust gas from the calciner.

In order to recover at least a portion of the heat content of the hot calciner discharge gas prior to venting the gas to the atmosphere, the clean gas leaving the electrostatic precipitator is passed in heat exchange relationship with a cooling fluid to further cool the gas, and preferably to evaporate at least a portion of the cooling portion to produce a heating vapor. Further, it is advantageous to partially cool the calciner discharge gas prior to passing the calciner discharge gas through the electrostatic precipitator.

The hot calcined clay dust entrained in the off-gas passing into the electrostatic precipitator is separated from the hot gas in the electrostatic precipitator and recovered. Preferably, the recovered hot calcined clay dust is mixed with the clay feed material being supplied to the calciner without substantially cooling the hot calcined clay powder collected in the electrostatic precipitator. In order to improve the dust collection efficiency of the electrostatic precipitator, the moisture content of the calciner exhaust gas passing through the electrostatic precipitator should be controlled at a level of at least 12% by volume of the gas.

The step of partially cooling the calciner discharge gas prior to passing the calciner discharge gas through the electrostatic precipitator may comprise injecting cooling air into the calciner discharge gas passing to the electrostatic precipitator, or passing the calciner discharge gas in heat exchange relationship with the clay feed material being supplied to the calciner whereby the clay feed material is preheated and the calciner discharge gas is partially cooled, or passing the calciner discharge gas in heat exchange relationship with a cooling fluid. Preferably, the cooling fluid comprises at least a portion of the cooling fluid to be thereafter passed in heat exchange relationship with the clean gas discharged from the electrostatic precipitator whereby the calciner discharge gas is partially cooled prior to introduction into the electrostatic precipitator and the cooling fluid is preheated prior to thereafter being passed in heat exchange relationship with the clean gas discharged from the electrostatic precipitator so as to produce a heating vapor.

The step of cooling the calcined clay product may be carried out by passing the hot calcined product discharged from the calciner in heat exchange relationship with at least a portion of the cooling fluid to be thereafter passed in heat exchange relationship with the clean gas discharge from the electrostatic precipitator whereby the calcined clay product is cooled and the cooling fluid is preheated prior to being passed in heat exchange relationship with the clean gas discharge from the electrostatic precipitator as to produce a heating vapor. Alternatively, the step of cooling the hot calcined clay product may comprise passing the hot calcined clay product discharged from the calciner in heat exchange relationship with a cooled heat exchange medium whereby the calcined clay product is cooled and the cooled heat exchange medium is heated, thence passing the heated heat exchange medium in heat exchange relationship with the clay feed material being supplied to the calciner whereby the clay feed material is preheated prior to being supplied to the calciner and the heated heat exchange medium is cooled, and thence recirculating the cooled heat exchange medium in heat exchange relationship with the hot calcined clay product.

The apparatus for the present invention for calcining a clay in an energy efficient manner comprises in combination a calciner, an electrostatic precipitator, a gas cooling means disposed upstream of the precipitator and heat exchange means disposed downstream of the electrostatic precipitator. The calciner defines an elongated calcining chamber having a material feed inlet for receiving the clay to be calcined at a first end thereof and a material feed outlet for discharging the calcined clay at a second end thereof. The calcining chamber also has a calcining gas discharge outlet at the first end thereof and provides a flow conduit through which the clay being calcined is passed in direct heat exchange contact with a hot calcining gas. Gas generating burners or a hot gas supply is operatively associated with the calciner for supplying hot calcining gas to the calcining chamber. Feed means are provided in operative association with the calciner for supplying the dry, pulverized clay powder to be calcined through the material feed inlet.

The electrostatic precipitator is disposed downstream with respect to gas flow of the calciner and has a gas inlet for receiving the hot gas from the calciner, a gas outlet for discharging clean gas, and a precipitation chamber disposed therebetween wherein at least a substantial portion of the clay particles entrained in the gas discharged from the calciner are removed from the gas as it passes through the precipitation chamber to produce a clean gas. First duct means are provided defining a gas flow path interconnecting the gas outlet of the calciner to the gas inlet of the precipitator. Second duct means are provided for defining a gas flow path interconnecting the gas outlet of the electrostatic precipitator to the gas inlet of the heat exchange means which is downstream with respect to gas flow of the electrostatic precipitator. The heat exchange means serves to cool the clean gas discharged from the electrostatic precipitator and recover a substantial portion of the waste heat therein. Preferably, the heat exchange means comprises a vapor generating means and the waste heat is recovered in the form of vapor generated by evaporating a cooling fluid passed in heat exchange relationship with the hot gas as it passes through the heat exchange means. Exhaust means are provided for receiving the cool clean gas from the outlet of the heat exchange means and venting the received cool clean gas to the atmosphere. Preferably, the vapor generating heat exchange means comprises a waste heat boiler wherein cooling water is passed in heat exchange relationship with the clean gas passing therethrough such that at least a portion of the water is evaporated to form steam thereby recovering a substantial portion of the heat in the hot gas discharged from the calciner. Preferably, recycle means are provided for transporting the clay particles removed from the gas discharged from the calciner as it passes through the electrostatic precipitator and collected in the precipitator to the feed means without substantially cooling the recycled clay particles during transport.

The gas cooling means provided upstream of the electrostatic precipitator decreases the temperature of the gas traversing the gas flow path interconnecting the gas outlet of the calciner to the gas inlet of the electrostatic precipitator, preferably, to a temperature level below at least about 900° F. The gas cooling means may comprise indirect heat exchange means disposed within the first duct means for circulating a cooling fluid in indirect exchange relationship with the hot gas from the calciner passing through the gas flow path defined by the first duct means whereby the gas is partially cooled and the cooling fluid is heated, and means for circulating the heated cooling fluid from the indirect heat exchange means comprising the gas cooling means to and through the downstream heat exchange means as the cooling fluid therein. Alternatively, the gas cooling means may comprise cooling air supply means operatively associated with the first duct means for injecting cool air into the hot gas as it passes through the calciner to the electrostatic precipitator. Further, the cooling gas means may comprise feed preheat means for preheating the clay to be calcined prior to feeding the clay to the calciner wherein the clay is passed in heat exchange relationship with the hot gas from the calciner thereby partially cooling the gas before it is admitted to the electrostatic precipitator. The feed preheat means may comprise a fluidized bed type heat exchanger where the clay to be calcined is passed in heat exchange relationship with the hot gas from the calciner in a fluidized state.

Preferably, the apparatus further comprises a product cooling means for cooling the calcined clay discharged from the calciner by passing the hot calcined product clay in heat exchange relationship with a cooling medium thereby cooling the calcined product clay and heating the cooling medium. The product cooling means may comprise a fluidized bed type heat exchanger wherein the calcined clay is passed in heat exchange relationship with a cooling medium in a fluidized state in a fluidizing medium with the fluidizing medium preferably comprising the cooling medium which may comprise air. Further, the cooling medium for cooling the calcined clay product may also comprise the heating medium for heating the clay to be calcined by providing means for conveying the cooling medium through the product cooling means in heat exchange relationship with the hot calcined clay from the calciner and thence conveying the heated cooling medium discharged from the product cooling means to and through the feed preheat means as the heating medium in heat exchange relationship with the clay to be calcined, and thence recirculating the cool heating medium back to the product cooling means as the cooling medium.

BRIEF DESCRIPTION OF THE DRAWINGS

The invention is diagramically illustrated, by way of example, in the drawings appended hereto, in which.

DESCRIPTION OF PREFERRED EMBODIMENT

Figure 1:
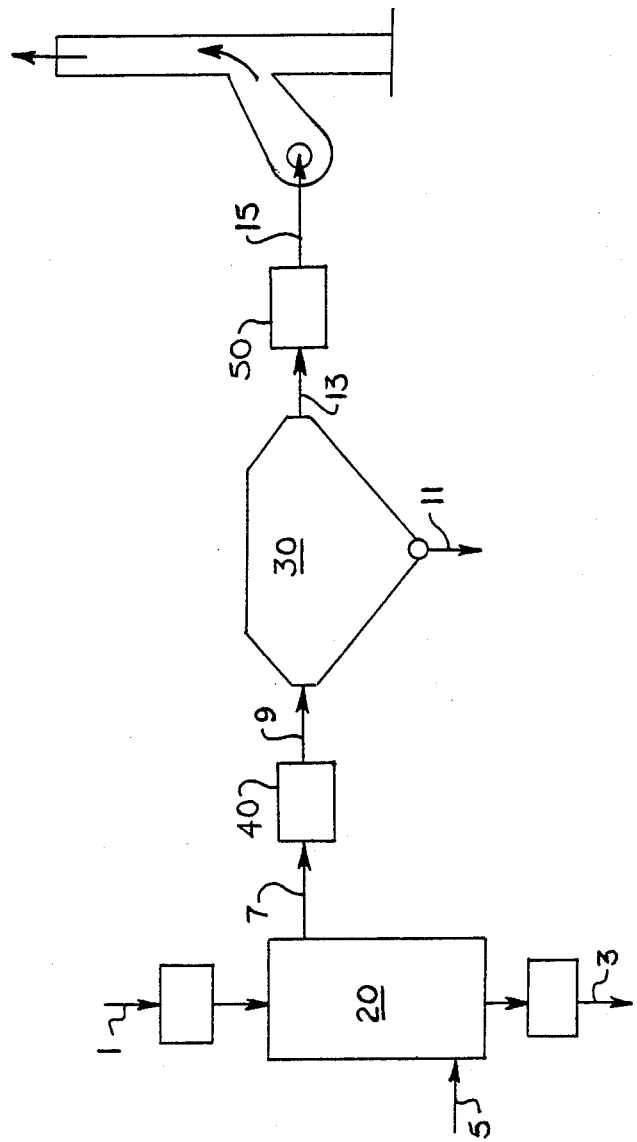
FIG. 1 is a block diagram schematically illustrating the general process of the present invention.
Figure 2:
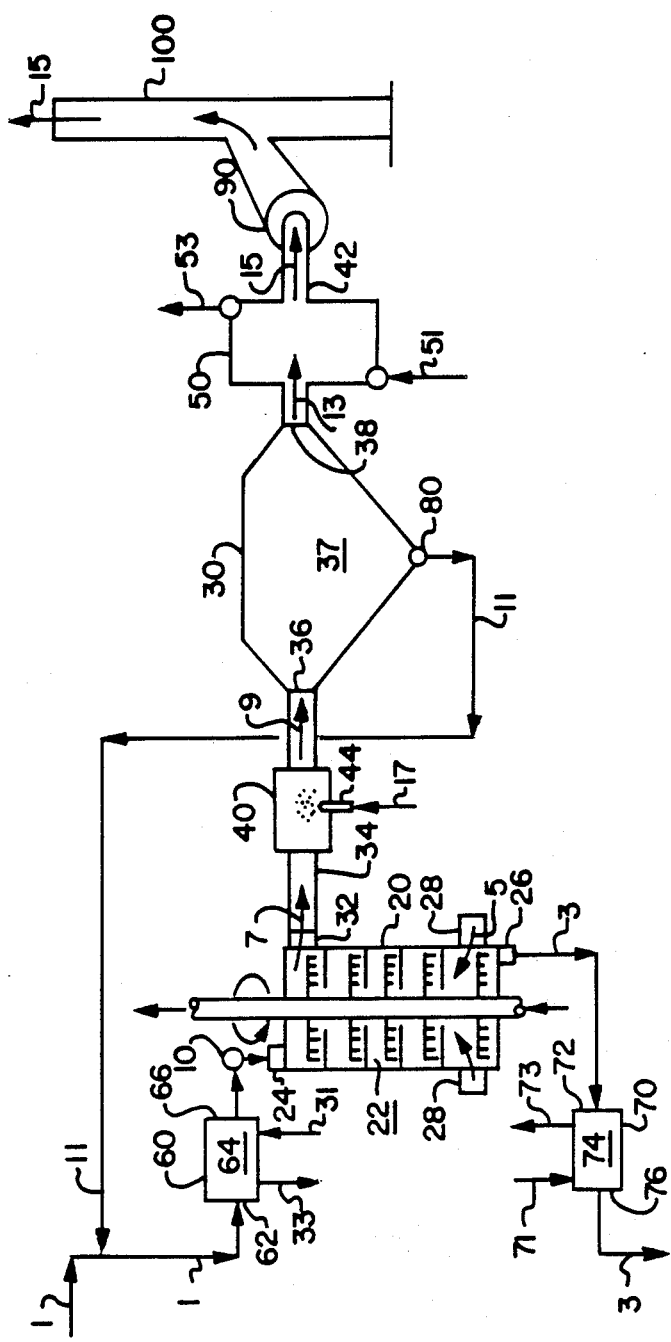
FIG. 2 is a block diagram schematically showing an apparatus arrangement for carrying out a preferred embodiment of the process of the present invention.

In order to be useful for paper filling, paper coating, paint making any other industrial purposes, natural occurring kaolin crude clays must generally processed to calcining to upgrade the clay in brightness and to minimize the abrasiveness of the clay. Although the particular procedures for upgrading the clay are not particularly germane the present invention, the conventional processing for beneficiating kaolin clay will be briefly reviewed. Typically, crude kaolin clay is first blunged in water with a dispersing agent to form a clay-in water suspension or slurry for further processing. This type of processing is generally referred to as wet-processing. After degritting and fractionation on a centrifuge to recover a desired particle size fraction, the fine particle fraction is typically diluted with water to 15% to 40% by weight solids content. The suspension is then generally treated with a bleaching compound containing a reducing agent, such as but not limited to dithionite, to reduce ferric ions in the clay to the ferrous state. After allowing the clay fraction to react with the reducing agent for a period of time, the clay fraction is then filter, rinsed and dried to concentrate the solids content of the clay for shipment. The bleaching process for removing discoloration impurities may also be enhanced or augmented by subjecting the crude clay slurry to flotation prior to the bleaching process.

To dewater the fine fraction, beneficiated low-solids aqueous clay slurry prior to calcination, the slurry is typically passed through a filter apparatus, such as a rotary vacuum filter, an electrically assisted vacuum filter, or a filter press, wherein the aqueous clay slurry is partially dewatered from a solids content typically in a range of 15% to 40% solids by weight to a solids content of about 50% to about 60% by weight. Further dewatering on such mechanical apparatus is impractical due to the fine particle size of the solids in the beneficiated clay slurry. Therefor, the partially dewatered clay slurry must next be passed in heat exchange relationship with a hot heat exchange fluid to evaporate the remaining water therefrom to produce an essentially moisture-free clay material.

In conventional dewatering, the partially dewatered kaolin slurry from the vacuum filter is typically passed to a spray dryer at a solids content of 40 to 60% solids wherein it is contacted with hot air or hot fuel gas produced by the combustion of fossil fuel in air. In the spray dryer, the remainder of the liquid water is removed from the suspension by contacting the clay particles and atomized liquid in the clay slurry directly with the hot drying medium. The spray dried kaolin clay is collected in the bottom of the spray dryer and then passed to a pulverizer wherein it is ground to produce a dry powder which will serve as feed material to the calciner. The dry powder feed material to the calciner is typically pulverized such that all of the clay particles pass through 325 mesh in order to produce a fine enough powder to ensure that each particle will be adequately processed in the calciner thereby ensuring uniformed properties in the resultant calcined product. A more detailed description of conventional spray drying and subsequent pulverizing process for preparing the clay for the calciner can be found in the aforementioned Mixon, Jr., U.S. Pat. No. 4,246,039 and Cummings et al., U.S. Pat. No. 4,717,559 disclosures, or in Smith, Jr., U.S. Pat. No. 4,642,904 which describes an energy conserving process for spray drying a clay slurry.

A particularly advantageous alternative method for concentrating the solids content of a clay slurry by evaporating water therefrom in Willis, U.S. Pat. No. 4,687,546. As disclosed therein, the kaolin slurry to be dried is passed in indirect heat exchange relationship with a heating vapor so as to evaporate water therefrom without contacting the beneficiated kaolin clay with the heating vapor. By avoiding the direct contact of the beneficiated kaolin clay with the heating vapor, the brightness degradation normally associated with the spray drying of kaolin clay is avoided. Additionally, substantial energy savings can be realized when at least a portion of the heating vapor utilized in each of the evaporative heat exchangers wherein the clay is indirectly contact with the heating vapor comprises water vapor previously evaporated from the aqueous clay slurry passing through another evaporative heat exchanger, except in the downstream- most of the evaporative heat exchangers wherein the heating vapor is supplied from an independent source, and typically comprises steam. Again, when the beneficiated kaolin has been dried to a substantially moisture free state, it is pulverized such that substantially all of the beneficiated kaolin has a particle size less than 325 mesh in preparation of being fed to the calciner.

The pulverized beneficiated clay product from the wet-processing operation is then subjected to calcination in a calciner in accordance with well known procedures. The calciner may be a rotary kiln or any of a number of commercial calcining furnaces, although in the preferred embodiment to be described herein, the preferred calciner is a Hankin-Nichols Multiple Hearth Furnace which is well known in the industry. The particular calcining procedure followed is also not critical to the present invention and any of a number of well known calcining procedures may be followed. Examples of particular calcining procedures may be found in Fanslow, U.S. Pat. No. 3,586,623; Proctor, Jr., U.S. Pat. No. 3,014,836; , and Witley et al., U.S. Pat. No. 3,798,044.

Such a multiple hearth calcining furnace comprises a substantially vertical calcining chamber which has disposed along its vertical axis a rotatable shaft having a plurality of rakes extending vertically outwardly therefrom at spaced intervals along the shaft. Each of the rakes extends into a subchamber formed in the furnace. Each subchamber forms a hearth in which the material being calcined is exposed to hot gases within a particular temperature range typically ranging from the hottest gas temperatures in the lower hearth to the coolest gas temperatures in the upper hearth. In the Hankin-Nichols device, burners are mounted in the walls of various hearths so as to generate the hot gases at the appropriate temperatures. However, it is to be understood that an indirectly fired calciner may also be utilized with the hot gases being generated outside of the calcining chamber and ducted thereto at the appropriate temperatures. As the shaft rotates, the rakes distribute the material across each subchamber and move the material from the uppermost chamber into which it is initially fed sequentially through the intermediate chambers into the lowermost chamber from which is discharged. As the material moves from chamber to chamber, it is passed in substantially counter flow heat exchange relationship with the hot gases initially supplied or generated in the lowermost hearth and vented from the uppermost hearth or subchamber of the calciner. Typically, the shaft is cooled by cooling air passed vertically upward through the center of the shaft and recovered as hot air after leaving the top of the shaft. This hot air may be utilized as the combustion air in the burners for generating the hot calcining gas or passed to a heat exchanger for heat recovery prior to being vented to the atmosphere.

The process of the present invention is illustrated generally in FIG. 1 of the drawing. The material to be calcined, such as dry, pulverized clay powder 1 is fed to a calciner 20. In the calciner 20, the clay powder to be calcined is exposed to a hot calcining gas 5 and passed in direct heat exchange contact, generally in counter flow relationship, with the hot calcining gas to heat the clay powder sufficiently to calcine substantially all of the clay powder passing through the calciner 20. After sufficient exposure to the calcining gas, the substantially calcined clay product 3 is discharged from the calciner 20. The spent calcining gas 7 is discharged from the calciner 20 and subsequently passed through an electrostatic precipitator 30 wherein at least a substantial portion of calcined clay powder elutriated from the calciner 20 and entrained in calciner discharge gas is removed therefrom.

As the calciner gas 7 may have a temperature as high as 1200° F., it is preferable to cool the calciner discharge gas 7 to a temperature level below at least about 900° F. in order that less costly materials may be used in the construction of the electrostatic precipitator. The cooling of the calciner discharge gas 7 may be accomplished by injecting cool tempering air into the calciner discharge gas 7 prior to introducing the calciner discharge gas 7 into the electrostatic precipitator. Alternatively, the cooling of the calciner discharge gas 7 may be accomplished by passing the calciner discharge gas 7 in heat exchange relationship with the clay feed material being supplied to the calciner to preheat the clay feed material and thereby cool the calciner discharge gas. Still further, the cooling of the calciner discharge gas 7 may be accomplished by passing a cooling fluid in heat exchange relationship with the hot calciner gas 7 to cool the calciner discharge gas and heat or heat and at least partially vaporize the cooling fluid, which may comprise any conventional heat exchange fluid including water, particularly if vaporization of the cooling fluid is desired, and DOWTHERM , a heat exchange fluid supplied by Dow Chemical Company which does not vaporize under the operating temperatures and conditions which would typically exist when being passed in heat exchange relationship with the hot calciner discharge gas.

Irrespective of how the calciner discharge gas 7 is cooled, it is preferred that the moisture content of the calciner discharge gas 9 entering the electrostatic precipitator 30 be maintained and controlled to a level of at least about 12% by volume and preferably to a level in the range of 13 to 15% by volume. It has been found in operating the electrostatic precipitator that the efficiency of removal of calcined clay particles from the gas stream deteriorates in the event that the moisture content of the calciner discharge gas passing therethrough drops below about 12% by volume. Accordingly, in order to maintain and/or control the moisture content of the calciner discharge gas 9 entering the electrostatic precipitator 30 to a level of at least about 12% by volume, it may be necessary to moisten the calciner discharge gas 9 by injecting water into it or into any cool tempering air added thereto.

As the calcined clay powder removed from the calciner discharge gas in the electrostatic precipitator 30 constitutes available product, this calcined clay powder is recovered and reprocessed as necessary to provide acceptable product. Preferably, the calcined clay powder removed from the calciner discharge gas is recycled to the calciner to be reprocessed and is mixed in its heated state, that is without substantial cooling subsequent to its separation and collection within the electrostatic precipitator, with the clay feed material being supplied to the calciner. It is desirable that the recovered calcined clay powder collected in the electrostatic precipitator 30 be reprocessed in the calciner 20 rather than merely added directly to the calcined clay product 3 as again treating the recovered clay in the calciner will ensure that any degradation in the properties of the recovered calcined clay subsequent to its initial calcination will be eliminated.

The clean gas 13 discharged from the electrostatic precipitator 30 will generally have a temperature range from a low level of about 300° F. to a high level of about 900° F. depending upon to what extent the hot calciner discharge gas 7 was cooled prior to entering the electrostatic precipitator 30. Therefore, the clean gas 13 exiting the precipitator 30 typically has substantial heat content which should be recovered by cooling the gas further prior to venting the gas to the atmosphere. Accordingly, the clean gas 13 is passed through heat exchange means 50 in heat exchange relationship with a cooling fluid 51 to recover a substantial portion of the heat content therein by cooling the clean gas 13 and heating or heating and vaporizing the cooling fluid 51. The cooled clean gas 15, typically cooled to a temperature in the range of about 250° F. to 350° F., is then vented to the atmosphere.

When the clean gas 13 exiting the precipitator 30 is at the upper end of its typical temperature range, the clean gas 13 is advantageously cooled by passing it in heat exchange relationship with a vaporizable cooling liquid, such as water, such that at least a portion of the cooling liquid is vaporized to form a heating vapor 53. Alternatively, the cooling liquid may be a non-vaporizable liquid at the operating temperature and conditions existing in the heat exchange means 50. In such case, the cooling liquid is merely heated as it is passed in heat exchange relationship with the clean gas 13 passing through the heat exchange means 50. The heat contained in the heated fluid 53 is recovered by utilizing that heat at some other stage of the calcining process or at some point in the beneficiation of the clay slurry in preparation for subsequent calcination.

Overall energy utilization in the process of calcining the clay may be further decreased in accordance with the present invention by preheating the clay 1 being supplied to the calciner 20 with heat recovered elsewhere in the calcination process and also by cooling the calcined clay product 3 discharged from the calciner 20. Advantageously, the heat recovered by cooling the calcined clay product 3 may be utilized as the source of heat for preheating the clay feed material 1 being supplied to the calciner 20. Alternatively, the hot calciner gas 7 discharged from the calciner 20 may be cooled prior to being passed to the electrostatic precipitator 20 by passing the hot calciner gas 7 in heat exchange relationship, directly or indirectly, with the clay feed material 1 whereby the hot calciner gas is desirably cooled and the clay feed material 1 preheated in an energy conserving manner.

Referring now to FIGS. 2, 3, 4 and 5 there are schematically depicted therein alternate plant layouts for calcining clay in accordance with alternate embodiments of the process the present invention. As depicted therein, the beneficiated kaolin clay 1 to be calcined is passed by feed means 10, such as a screw conveyor or equivalent device to calciner 20. The calciner 20 defines an elongated calciner chamber 22, which as previously discussed may have a number of subchambers. The calciner 20 has a material feed inlet 24 at the top thereof for receiving the clay 1 to be calcined and a material discharge outlet 26 at the bottom thereof for discharging the calcined clay product 3. Hot gas generating means 28 is operatively associated with the calciner 20 for supplying hot calcining gas to the calcining chamber 22. The hot gas generating means 28 may comprise an independent gas generating furnace when the calciner 20 constitutes an indirectly fired furnace or as in the case of the preferred multiple hearth furnace, the hot gas generating means 28 comprises a plurality of burners mounted in the side walls of the multiple hearth furnace so as to generate hot gas for direct introduction into at least one of the subchambers of the multiple hearth furnace. In either case, the hot gas 5 passes upwardly from a lower elevation where it is generated or introduced into the calcining chamber 22 of the calciner 20 upwardly and substantially in counter flow movement to the clay to be calcined which is passing downwardly through the calcining chamber 22 from the feed inlet 24 to the product discharge outlet 26. Upon reaching an upper region of the calcining chamber 22, the hot gas is discharged from the calciner 20 through the gas outlet 32 in the upper vicinity thereof at the same end of the calciner 20 as the feed inlet 24. The hot gas leaving the calcining chamber 22 passes through the gas outlet 32 into the first duct means 34 which interconnects the gas outlet 32 of the calciner 20 to the gas inlet 36 of the precipitator 30 located downstream thereof.

The electrostatic precipitator 30 is disposed downstream with respect to gas flow of the calciner 22 and has a gas inlet 36 for receiving gas from the calciner 20 through gas duct 34 interconnecting the calciner 20 to the precipitator 30, a gas outlet 38 for discharging clean gas from the electrostatic precipitator chamber 37 disposed between the gas inlet 36 and the gas outlet 38. As the hot gas from the calciner 20 passes through the precipitation chamber 37 of the precipitator 30 any particles of calcined clay product entrained in the hot gas discharged from the calciner 20 are subjected to an electrostatic field which results in the particles being charged so that they will collect on oppositely charged electrodes disposed within the precipitation chamber 37 in the well known conventional manner. The collecting electrodes (not shown) disposed within the precipitation chamber 37 are periodically rapped or otherwise cleaned in conventional manner to remove the calcined clay product collecting thereon which is collected in the lower portion of the precipitation chamber 37.

The stream of clean gas 13 passing out of the precipitation chamber 37 through the gas outlet 38 of the electrostatic precipitator 30 passes through duct 42 which interconnects the outlet 38 of the electrostatic precipitator 30 with the inlet of the induced draft fan 90 disposed downstream thereof. The induced draft fan 90 serves to vent the clean gas to the atmosphere through gas stack 100 into which the fan 90 discharges. The collected calcined clay particles removed from the gas stream in the precipitator 30 are fed by recycled means 80 from the hopper of the precipitator 30 to the feed means 10 to be recycled through the calciner 20. The stream of recycle calcined clay product 11 is recycled without substantial cooling so that it may be mixed with the beneficiated kaolin clay powder 1 being fed to the calciner 20. In this manner, the heat contained within the recycled calcined clay particles 11 will be transferred to the incoming feed clay particles 1 thereby assisting in the preheating of the clay particles 1 and recovering energy which would otherwise be lost from the system. A further advantage of recycling the recovered clay product 11 into the feed material 1 is that any degradation in clay properties experienced by the clay particles subsequent to calcining is restored when the recycled clay particles are again calcined.

In order to recover a substantial portion of the sensible heat contained in the hot gas 7 discharged from the calcining chamber 22 of the calciner 20, heat exchange means 50 is disposed downstream with respect to gas flow of the electrostatic precipitator 30 in the gas duct 42 interconnecting the gas outlet 38 of the electrostatic precipitator 30 with the gas inlet of the downstream induced draft fan 90 such that the hot clean gas 13 must pass through the heat exchange means 50 in heat exchange relationship with a cooling fluid 51.

As the hot clean gas 13 traverses the heat exchange means 50, the clean gas 13 is further cooled and the cooling fluid 51 is heated to recover waste heat contained in the clean gas 13 prior to venting the clean gas 13 to the atmosphere. The heated fluid 53 may be utilized elsewhere in the plant, such as to heat kaolin slurry in the wet processing beneficiation of the kaolin clay prior to calcination, or may be used elsewhere in the processing of the clay in accordance with the present invention such as hereinafter described.

Although the cooling fluid 51 passed in heat exchange relationship with the hot clean gas 13 in the heat exchange means 50 may comprise a heat exchange fluid which is not evaporated, but rather merely heated without phase change at the conditions experienced within the heat exchange means 50, in which case the heat exchange means 50 preferably comprises a water tube fluid heater, although it is preferred that the heat exchange means 50 be operated as a vapor generating heat exchanger, such as a water tube boiler, and that the cooling fluid 51 comprises a vaporizable liquid such as water.

As the hot clean gas 13 traverses the vapor generating means 50, the hot clean gas 13 is cooled and at least a portion of the cooling fluid 51, typically water, is evaporated to form a heating vapor 53, typically steam, which may be utilized for various purposes within the clay processing plant so that the heat contained therein and transferred thereto from the hot clean gas 13 is recovered rather than being lost to the atmosphere when the gas is vented to the atmosphere through stack 100. Typically, the hot clean gas 13 passing out of the electrostatic precipitator 30 into the vapor generating heat exchange means 50 will have a temperature in the range of about 700° F. to about 900° F. and will typically be at a temperature of about 800° F. The cooled clean gas 15 passing from the vapor generating means 50 to the inlet of the fan 90 for venting to the atmosphere through the stack 100 will typically have a temperature ranging from about 250° F. to 350° F. depending upon the actual temperature of the hot clean gas 13 entering the vapor generating means 50. It is contemplated that up to 10,000,000 BTUs per hour of heat that would otherwise be lost to the atmosphere when the discharged gas from the calciner is vented to the atmosphere is instead recovered as the enthalpy of the heating vapor 53 generated by passing the cooling fluid 51 in heat exchange relationship with the gas as it passes through the vapor generating means 50.

Typically, the hot particulate laden gas leaving the calcining chamber 22 of the calciner 20 will have a temperature of about 1000° F. but may range as high as 1200° F. Although electrostatic precipitators can be designed to handle a gas having a temperature of 1000° to 1200° F., such a provision generally requires that more costly heat resistant materials be utilized in constructing the electrostatic precipitator and its electrodes and other internal components. In order to lower the cost of the electrostatic precipitator thereby reducing the cost of the material from which it is constructed, it is desirable to decrease the temperature of the gas entering the electrostatic precipitator to a temperature level below at least about 900° F. and preferably in the range of 800° F. Accordingly, gas cooling means 40 for decreasing the temperature of the hot calciner discharge gas 7 traversing the gas flow path defined within the duct 34 interconnecting the outlet 32 of the calciner 20 with the gas inlet 36 to the precipitator 30.

Figure 3:
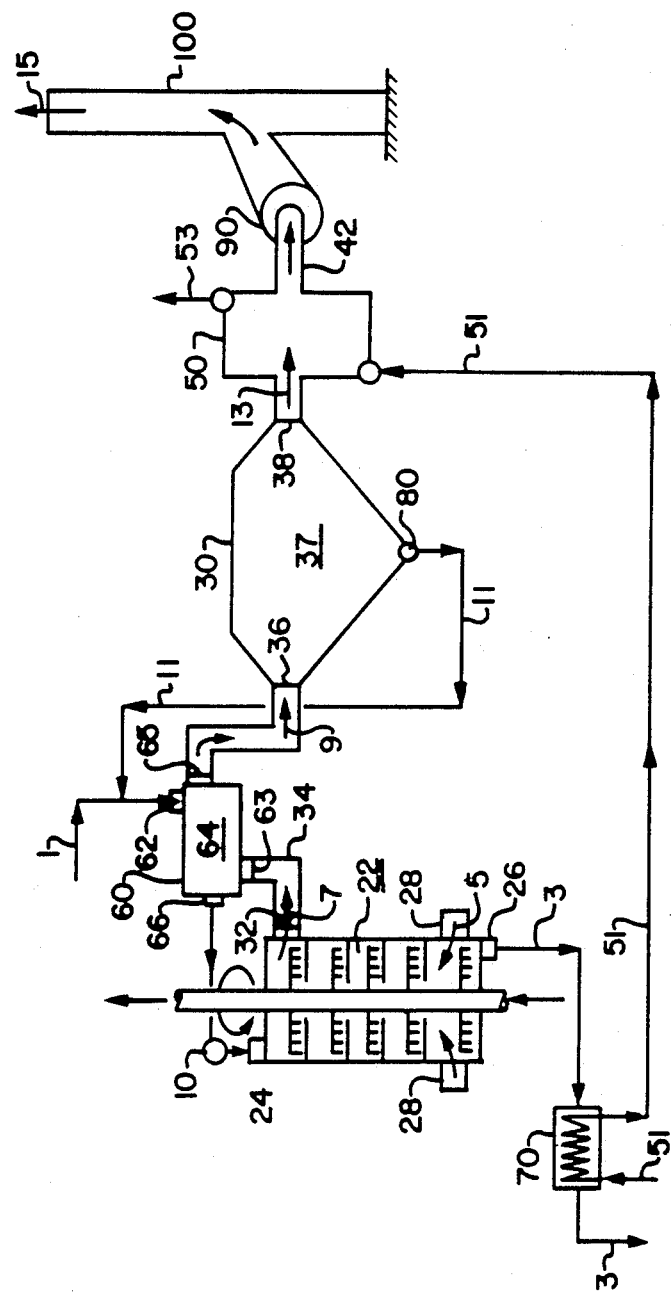
FIG. 3 is a block diagram schematically showing an apparatus arrangement for carrying out an alternate preferred embodiment of the process of the present invention.

As illustrated in FIG. 3, the gas cooling means 40 may simply comprise means 44 for injecting cool, and preferably moist, tempering air 17 into the gas duct 34 such that it mixes with the hot calciner gas passing therethrough so as to reduce the temperature of the overall gas stream entering the precipitator 30. Typically the tempering air would be ambient air whose exact temperature would of course depended upon the time of the year. Caution must be exercised when injecting tempering air into the hot discharge gas from the calciner 20 to ensure that the moisture content of the gas stream entering the electrostatic precipitator is maintained at least 12% by volume and preferably in the range of 13 to 15% by volume of the gas stream entering the electrostatic precipitator. It has been found in operating the electrostatic precipitator that the efficiency of removal of calcined clay particles from the gas stream deteriorates in the event that the moisture content of the gas stream passing therethrough drops below 12% by volume. Accordingly, it may be necessary to moisten the tempering air 17 by adding water thereto prior to injecting the tempering air into the hot gas stream traversing duct 34.

Figure 4:
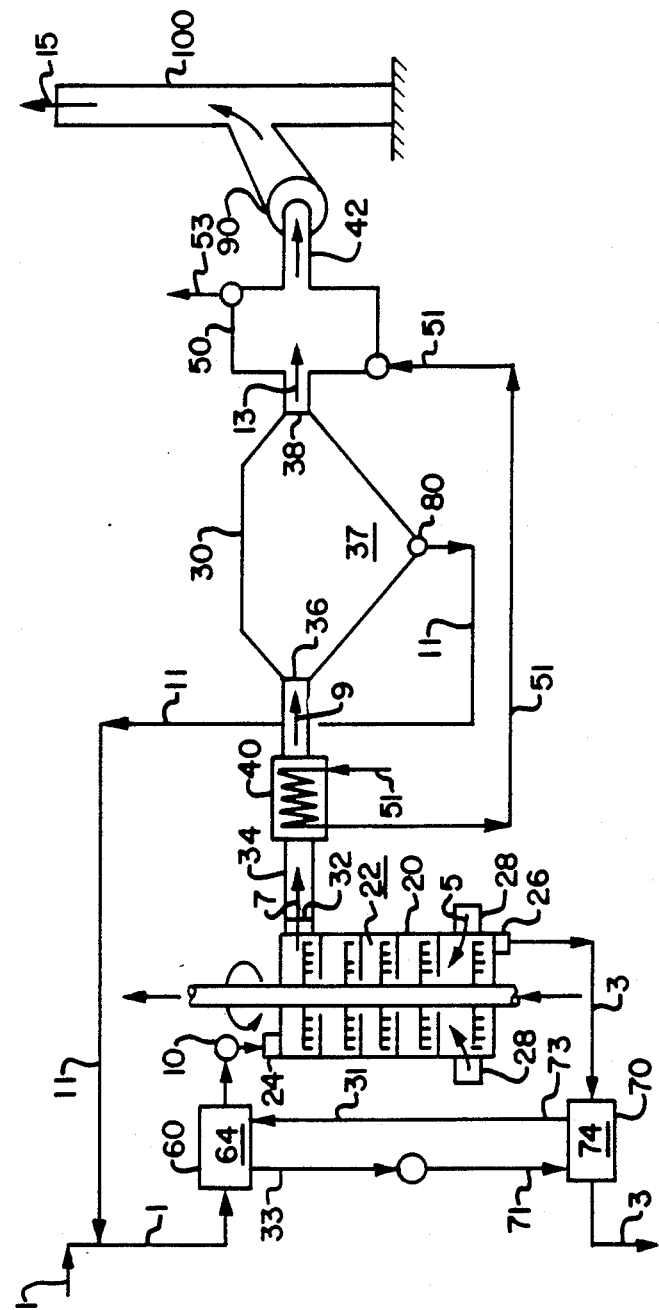
FIG. 4 is a block diagram schematically showing an apparatus arrangement for carrying out another preferred embodiment of the process of the present invention.
Figure 5:
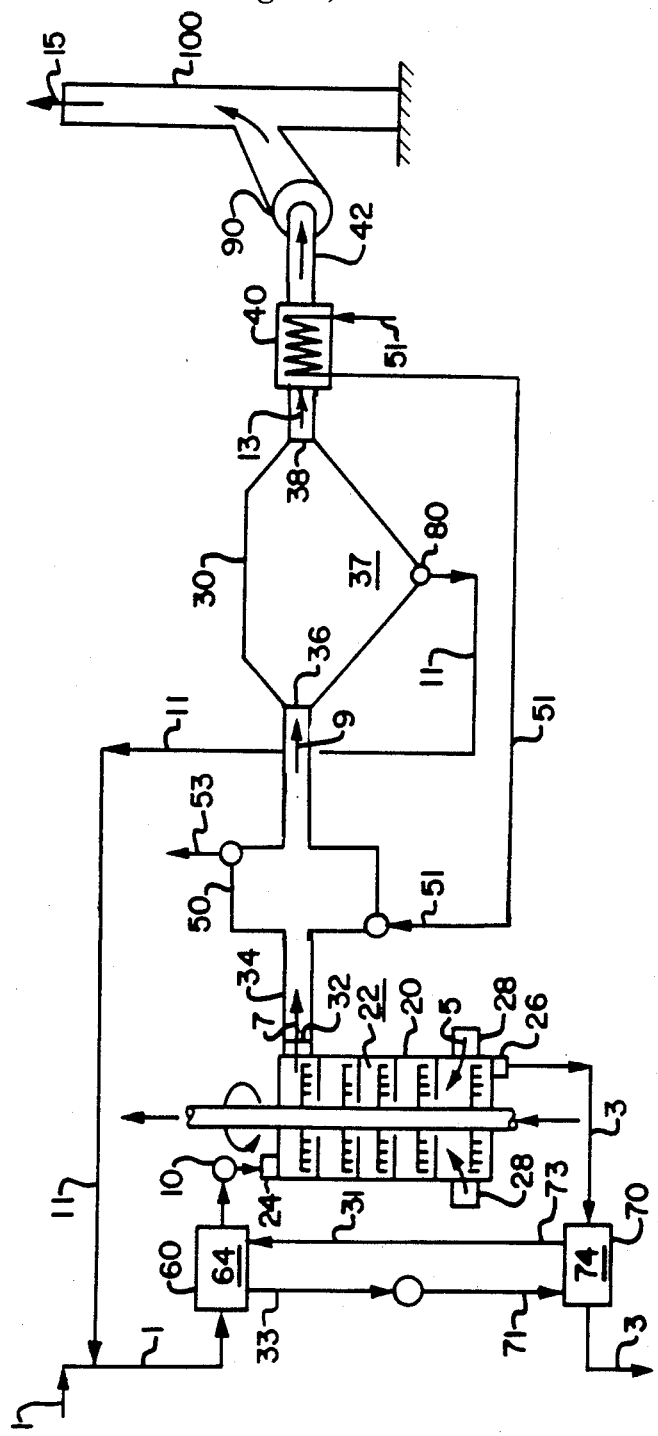
FIG. 5 is a block diagram schematically showing an apparatus arrangement for carrying out still another preferred embodiment of the process of the present invention.

The gas cooling means 40 may also comprise conventional heat exchanger means for passing a cooling fluid in indirect heat exchange relationship with the hot calciner discharge 7 traversing duct 34. Advantageously, the feed liquid 51 to the downstream heat exchange means 50 may be passed through a heat exchange coil disposed in duct 34 to cool the gas 7 passing through duct 34 and preheat the feed liquid 51 to the heat exchange means 50 as illustrated in FIG. 4.

Alternatively, the gas cooling means 40 may comprise a waste heat fluid heater or waste heat boiler 52 wherein a heat exchange fluid, which in the case of a water-tube boiler comprises a vaporizable fluid such as water, is passed in indirect heat exchange relationship with the hot calciner discharge gas 7 traversing the duct 34. Accordingly, the calciner discharge gas 7 will be substantially cooled, such that the cooled gas 9 entering the electrostatic precipitator will typically have a temperature in the range of 300° F. to 500° F. The heated fluid or heating vapor 53 generated by passing the fluid 51 in heat exchange relationship through the waste heat fluid heater or boiler 52 may be utilized for various purposes within the clay processing plant so that the heat contain therein and transferred thereto from the clean gas 13 is recovered rather then being lost to the atmosphere. If there remains sufficient recoverable energy in the gas 9 leaving the waste heat fluid heater or boiler 52, the clean gas 13 exiting the electrostatic precipitator 30 is passed through an additional heat exchange means disposed in duct 42 wherein the clean gas 13 is passed in heat exchange relationship with a cooling fluid to further cool the gas and to heat the cooling fluid. Advantageously, the cooling fluid may comprise the cooling fluid 51, in which case the cooling fluid 51 is passed through a recuperative to the heat exchanger 46, such as a finned tube economizer, wherein the cooling fluid 51 is passed in indirect heat exchange relationship with the clean gas 13 whereby the cooling fluid 51 is preheated prior to being passed through the upstream was&e heat fluid heater or boiler 52 and the clean gas is further cooled prior to venting to the atmosphere.

To further improve the energy efficiency of the calcining process, product cooling means 70 is provided for cooling the calcined product clay 3 discharged from the calciner 20. The product cooling means 70 has an inlet 72 for receiving the calcined clay product 3 from the product discharge outlet 26 of the calciner 20, an outlet 76 for discharging the cooled calcined product clay, and a heat exchange chamber 74 disposed therebetween wherein the calcined clay is passed in heat exchange relationship with a cooling medium 71 thereby cooling the calcined clay and heating the cooling medium. The heated cooling medium 73 may then be passed in heat exchange relationship with a secondary heat exchange medium to recover the heat removed from the product as it passes through produce cooling means 70. Typically, the calcined clay product discharged from the calciner 20 will have a temperature of about 2000° F. and will be cooled by heat exchange with the cooling medium in the product cooler to a temperature of less than about 350° F. The secondary heat exchange fluid may comprise the feed liquid 51 to the heat exchange means 50 in which case the heat recovered from the hot product in the product cooling means 70 will be used to preheat the feed liquid 51 to the heat exchange means 50 as shown in FIG. 3. Alternatively, the heat recovered from the product calcined clay as it passes through the product cooling means 70 may be utilized by transferring the recovered heat from the secondary heat exchange medium by preheating the beneficiated clay feed 1 being supplied to the calciner, or it may simply be utilized at some point in the overall clay beneficiating process to preheat clay slurry. In any case, the overall energy efficiency of the calcining process will be increased by recovering heat from the calcined clay product in accordance with the present invention.

The efficiency of the calcining process of the present invention is further enhanced by providing feed preheat 60 for preheating the clay 1 to be calcined prior to feeding the clay to the calciner 20. The feed preheat means 60 has an inlet 62 for receiving the clay to be calcined, an outlet 66 for discharging the preheated clay, and a heat exchange chamber 64 disposed therebetween wherein the clay 1 to be calcined is passed in heat exchange relationship with a heating medium 31 whereby the clay to be calcined is preheated and the heating medium is cooled. Typically, the beneficiated clay powder being fed from the spray dryer or other evaporator to the calciner would have a temperature without preheat ranging from ambient to about 150° F. However, with preheating of the calciner feed stream 1, its temperature will be raised to a level in the range 200° F. to 300° F.

Alternatively, as illustrated in FIG. 3, the heating fluid 31 to be passed in heat exchange relationship with the calciner clay feed stream 1 in the feed preheater 60 may advantageously comprise the hot calciner discharge gas 7 passing through the duct 34 to the precipitator 30. That is, the gas cooling means 40 for cooling the hot calciner discharge gas 7 prior to its admission to the electrostatic precipitator may comprise the feed preheater means 60. In such an application, the feed preheater means has in addition to the inlet 62 for receiving the clay to be calcined and the outlet for discharging the preheated clay, a gas inlet 63 in flow communication with an upstream portion of the duct 34 or directly with the gas outlet 32 of the calciner 20 for receiving hot gas 7 discharged from the calciner 20 and a gas outlet 65 in flow communication with a downstream portion of the duct 24 or directly with the gas inlet 36 of the precipitator 30 for discharging the partially cooled calciner gas 9 to the electrostatic precipitator 30 within the heat exchange chamber 64 within the feed preheat means 60. The clay 1 to be calcined is passed in direct heat exchange relationship with the hot gas 7 from the calciner 20 whereby the clay to be calcined is preheated and hot gas is partially cooled in accordance with the present invention. Preferably, the feed preheat means in this instance comprises a fluidized bed type heat exchanger wherein the clay to be calcined is passed in heat exchange relationship with the hot calciner gas in a fluidized state. The fluidizing medium is also the hot calciner gas 7 so that the calciner gas performs both the function of fluidizing the clay to be calcined and preheating the clay to be calcined.

Although the heating medium 31 passed in heat exchange relationship with the clay 1 being fed to the calciner 20 in the feed preheater 60 also may comprise a heating fluid from any source including steam generated from an independent source within the plant, it is advantageous if the heating medium 31 comprises a heating fluid generated from the recovery of heat from the calcined process. Accordingly, the heating fluid 31 may comprise the heated fluid or steam 53, or at least a portion thereof, generated in the heat exchange means 50 or a hot liquid generated by passing a heat exchange liquid in heat exchange relationship with the steam 53 generated in the vapor generating means 50.

Alternatively, as illustrated in FIG. 4, the heating fluid 31 may comprise the heated cooling medium 73 generated by passing the cooling medium 71 in heat exchange relationship with the hot calcined clay product passing through the product cooling means 70 or another heating liquid produced by passing a heat exchange fluid in heat exchange relationship with the heated cooling medium 73. When the heated cooling medium 73 serves as the source of heat for the heating fluid 31 being supplied to the feed preheater 60, the heat recovered from the calcined clay product 3 is utilized to increase the efficiency of the overall calcining process by transferring that recovered heat to the calciner feed thereby preheating the clay 1 being supplied to the calciner. In such a system, the cooled heating fluid 73 being discharged from the feed preheater 60 after having passed in heat exchange relationship with the calciner clay feed stream 1 may serve as the cooling medium 71 being supplied to the product cooling means 70 to be passed in heat exchange relationship with the hot calcined clay product stream 3 to cool the product stream and produce the heated cooling medium 73 which in turn can again serve as the heating medium 31 to be supplied to feed preheater 60. Of course, a single heat exchange fluid may be circulated by circulator means 39 through a continuous circulation loop between product cooling means 70 and the feed preheat means 60.

I claim:

1. An energy conserving process for calcining a clay comprising:
  a. feeding a dry pulverized clay powder as feed material to a calciner to be calcined therein;
  b. passing the clay powder to be calcined through the calciner in direct heat exchange contact with a hot calcining gas passing therethrough whereby the clay powder is sufficiently heated to calcine substantially all of the clay powder passing through the calciner and the hot calcining has is somewhat cooled;
  c. removing the calcined clay powder from the calciner and discharging the calcining has from the calciner;
  d. subjecting the calciner discharge gas to electrostatic precipitation to clean the calciner discharge gas prior to venting the calciner discharge gas to the atmosphere whereby at least a substantial portion of calcined clay powder entrained in the calciner discharge gas is removed therefrom; and
  e. collecting the hot calcined clay powder separated from the gas during electrostatic precipitation and mixing the collected hot calcined clay powder with the clay feed material being supplied to the calciner without substantially cooling the collected hot calcined clay powder prior to mixing with the feed material;
  f. passing the calciner discharge has in heat exchange relationship with at least a portion of a cooling fluid prior to subjecting the calciner discharge gas to electrostatic precipitation so as to preheat the cooling fluid and partially cool the calciner discharge gas and thereafter subsequent to subjecting the calciner discharge gas to electrostatic precipitation passing the preheated cooling fluid in heat exchange relationship with the cleaner calciner discharge gas whereby the cleaned calciner discharge gas is further cooled.

2. A process for calcining clay is recited in claim 1 further comprising partially cooling the calciner discharge gas to a temperature below at least about 900° F. prior to subjecting the calciner discharge gas to electrostatic precipitation.

3. A process for calcining clay as recited in claim 2 wherein the step of partially cooling the calciner discharge gas prior to subjecting the calciner discharge gas to electrostatic precipitation comprises injecting cooling air into the calciner discharge gas prior to subjecting the calciner discharge gas to electrostatic precipitation.

4. A process for calcining clay as recited in claim 2 wherein the step of partially cooling the calciner discharge gas prior to subjecting the calciner discharge to electrostatic precipitation comprises passing the calciner discharge gas in heat exchange relationship with the clay feed material being supplied to the calciner whereby the clay feed material being supplied to the calciner is preheated and the calciner discharge gas is partially cooled prior to being subjected to electrostatic precipitation.

5. A process for calcining clay as recited in claim 2 further comprising further cooling the calciner discharge gas subsequent to subjecting the calciner discharge gas to electrostatic precipitation to recover a substantial portion of the heat content therein.

6. A process for calcining clay as recited in claim 1 further comprising controlling moisture content of the partially cooled calciner discharge gas subjected to electrostatic precipitation to a level of at least 12% by volume of the gas.

7. An energy conserving process for calcining a clay comprising:
   a. feeding a dry, pulverized clay powder as feed material to a calciner to be calcined therein;
   b. passing the clay powder to be calcined through the calciner in direct heat exchange contact with a hot calcining gas passing therethrough whereby the clay powder is sufficiently heated to calcine substantially all of the clay powder passing through the calciner and the hot calcining gas is somewhat cooled;
   c. removing the calcined clay powder from the calciner and discharging the calcining gas from the calciner;
   d. cooling the calciner discharge gas to a temperature level below at leas about 900° F.;
   e. subjecting the cooled calciner discharge gas to electrostatic precipitation to remove at least a substantial portion of calcined clay powder entrained in the cooled calciner discharge gas;
   f. controlling the moisture content of the cooled calciner discharge gas passing through the electrostatic precipitator to a level of at least 12% by volume of the gas; and
   g. recovering the hot calcined clay powder separated from the gas during electrostatic precipitation.

8. A process for calcining olay as recited in claim 7 wherein the step of r-covering the hot calcined clay powder separated from the gas during electrostatic precipitation comprises collecting the hot calcined clay powder separated from the gas during electrostatic precipitation and mixing the collected hot calcined clay powder with the clay feed material being supplied to the calciner without substantially cooling the collected hot calcined clay powder prior to mixing with clay feed material.

9. A process for calcining clay as recited in claim 7 further comprising injecting cool air into the calciner discharge gas prior to introducing the calciner discharge gas into the electrostatic precipitator.

10. A process for calcining clay as recited in claim 7 wherein the step of cooling the calciner discharge gas comprises passing the calciner discharge gas in heat exchange relationship with at least a portion of a cooling fluid to be thereafter passed in heat exchange relationship with the clean gas discharged from the electrostatic precipitation step whereby the calciner discharge has is partially cooled prior to being subject to electrostatic precipitation and the cooling fluid is preheater prior to being thereafter passed in heat exchange relationship with the clean gas discharged from the electrostatic precipitation step.

11. A process for calcining clay as recited in claim 7 further comprising the step of passing the hot calcined clay product discharged from the calciner in heat exchange relationship with at least a portion of a cooling fluid to be thereafter passed in heat exchange relationship with the clean gas discharged from the electrostatic precipitation step whereby the calcined clay product is cooled and the cooling fluid is preheated prior to being passed in heat exchange relationship with the clean gas discharge from the electrostatic precipitation step.

12. A process for calcining as recited in claim 7 further comprising the step of passing the hot calcined clay product discharged from the calciner in heat exchange relationship with a cooled heat exchange medium whereby the calcined clay product is cooled and the cooled heat exchange medium whereby the heat exchange medium is heated, thence passing the heated heat exchange medium in heat exchange relationship with clay feed material being supplied to the calciner whereby the clay feed material is preheated prior to being supplied to the calciner and the heated heat exchange medium is cooled, and thence recirculating the cooled heat exchange medium in heat exchange relationship with the hot calcined clay product.

13. Apparatus for calcining a clay in an energy conserving manner, said apparatus comprising:
   a. a calciner defining an elongated calcining chamber having a material feed inlet for receiving the clay to be calcined and a calcining gas discharge outlet at a first end thereof and a material feed outlet for discharging the calcined clay from said calciner at a second end thereof, the calcining chamber providing a flow conduit through which the clay being calcined passes in direct heat exchange contact with a hot calcining gas;
   b. means operatively associated with said calciner for supplying hot calcining gas to the calcining chamber;
   c. vent means for venting the gas discharged from said calciner to the atmosphere;
   d. means for providing a gas flow path interconnecting the gas outlet of said calciner to the means for venting the gas discharged from said calciner to the atmosphere;
   e. an electrostatic precipitator disposed downstream with respect to gas flow of said calciner in the gas flow path interconnecting the gas outlet of said calciner to the means for venting the gas discharged from said calciner to the atmosphere, said electrostatic precipitator having a gas inlet for receiving gas from said calciner, a gas outlet for discharging cleaned gas from said electrostatic precipitator, and a precipitation chamber disposed therebetween, the precipitation chamber defining a flow path through an electrostatic field whereby at least a substantial portion of clay particles entrained in the gas discharged from said calciner are removed from the gas as it traverses the flow path through said electrostatic precipitator to produce a clean gas;

f. heat recovery means disposed in the gas flow path interconnecting the gas outlet of said calciner to the means for venting the gas discharged from said calciner to the atmosphere for recovering at least a portion of the heat content of the gas discharged from said calciner and cooling the gas discharged from said calciner prior to venting to the atmosphere;

g. feed means operatively associated with said calciner for supplying dry, pulverized clay powder to said calciner through the material fused inlet thereto;

h. means for recovering the clay particles removed from the gas discharged in said calciner from said electrostatic precipitator; and i. product cooling means for cooling the calcined clay discharged from calciner, said product cooling means comprising a fluidized bed type heat exchanger having an inlet for receiving the hot calcined clay from said calciner, an outlet for discharging cooled calcined clay, and a heat exchange chamber disposed therebetween wherein the calcined lay is passed in heat exchange relationship with a cooling medium in a fluidized state in a fluidizing medium thereby cooling the calcined clay and heating the cooling medium.

14. Apparatus for calcining a clay as recited in claim 13 wherein the fluidizing medium comprises the cooling medium and the cooling medium comprises air.

15. Apparatus for calcining a clay in an energy conserving manner, said apparatus comprising:

a. a calciner defining an elongated calcining chamber having a material feed inlet for receiving the clay to be calcined and a calcining gas discharge outlet at a first end thereof and a material feed outlet for discharging the calcined clay from said calciner at a second end thereof, the calcining chamber providing a flow conduit through which the clay being calcined passes in direct heat exchange contact with a hot calcining gas;

b. means operatively associated with said calciner for supplying hot calcining gas to the calcining chamber;

c. vent means for venting the gas discharged from said calciner to the atmosphere;

d. an electrostatic precipitator disposed downstream with respect to gas flow of said calciner and upstream with respect to gas flow of said means for venting the gas discharged from said calcined to the atmosphere, said electrostatic precipitator having a gas inlet for receiving gas from said calciner, a gas outlet for discharging cleaned gas from said electrostatic precipitator, and a precipitation chamber disposed therebetween, the precipitation field whereby at least a substantial portion of clay particles entrained in the gas discharged from said calciner are removed from the gas as it traverses the flow path through said electrostatic precipitator to produce a clean gas;

e. first duct means for providing a gas flow path interconnected the gas outlet of said calciner to the gas inlet to the precipitation chamber of said electrostatic precipitator;

f. second duct means for providing a gas flow path interconnecting the gas outlet from the precipitation chamber of said electrostatic precipitator to said vent means;

g. gas cooling means for decreasing the temperature of the gas traversing the gas flow path defined by the first duct interconnecting the gas outlet of said calciner to the gas inlet of said electrostatic precipitator to a temperature level below at least about 900° F., said gas cooling means comprising an indirect heat exchange means disposed within said first duct means for circulating cool water is indirect heat exchange relationship with the hot gas from said calciner passing through the gas flow path defined by said first duct means whereby the gas is partially cooled and the water is heated, and means for circulating the heated water from said indirect heat exchange means to and through said waste heat boiler as the cooling fluid therein;

h. waste heat boiler means disposed downstream with respect to gas flow of said electrostatic precipitation in the gas flow path defined by the second duct interconnecting the gas outlet of said electrostatic precipitator to said vent means for cooling the clean gas discharge from said electrostatic precipitator, said waste boiler having a gas inlet for receiving the clean gas discharged from said electrostatic precipitator, a gas outlet for discharging cooled clean gas, and a heat exchange chamber disposed therebetween wherein the gas passing therethrough is passed in heat exchange relationship with a cooling fluid comprising water, at least a portion of which when passed in heat exchange relationship with the clean gas passing therethrough is evaporated to form steam;

i. feed means operatively associated with said calciner for supplying dry pulverized clay powder of said calciner through the material feed inlet thereto; and j. means for recovering the clay particles removed from the gas discharged in said calciner from said electrostatic precipitator.

16. Apparatus for calcining a clay as recited in claim 15 wherein the means for recovering the clay particles removed from the gas discharged from said calciner comprises recycle means for transporting the clay particles removed from the gas discharged from said calciner from said electrostatic precipitator to said feed means without substantial cooling of the recycled clay particles during transport.

17. Apparatus for calcining a clay in an energy conserving manner comprising:

a. a calciner defining an elongated calcining chamber having a material feed inlet for receiving the clay to be calcined and a calcining gas discharge outlet at a first end thereof and a material feed outlet for discharging the calcined clay from said calciner at a second end thereof, the calcining chamber providing a flow conduit through which the clay being calcined passes in direct heat exchange contact with a hot calcining gas;

b. means operatively associated with said calciner for supplying hot calcining gas to the calcining chamber;

c. vent means for venting the gas discharged from said calciner to the atmosphere;

d. means for providing a gas flow path interconnecting the gas outlet of said calciner to the means for venting the gas discharged from said calciner to the atmosphere;

e. an electrostatic precipitator disposed downstream with respect to gas flow of said calciner in the gas flow path interconnecting the gas outlet of said calciner to the means for venting the gas discharged from said calciner to the atmosphere, said electrostatic precipitator having a gas inlet for receiving gas from said calciner, a gas outlet for discharging cleaned gas from said electrostatic precipitator, and a precipitation chamber disposed therebetween, the precipitation chamber defining a flow path through an electrostatic field whereby at least a substantial portion of clay particles entrained in the gas discharged from said calciner are removed from the gas as it traverses the flow path through said electrostatic precipitator to produce a clean gas;

f. heat recovery means disposed in the gas flow path interconnecting the gas outlet of said calciner to the means for venting the gas discharged from said calciner to the atmosphere for recovering at least a portion of the heat content of the gas discharged from said calciner and cooling the gas discharged from said calciner prior to venting to the atmosphere;

g. feed means operatively associated with said calcined for supplying dry; pulverized clay powder to said calcined through the material feed inlet thereto;

h. means for recovering the clay particles removed from the gas discharged in said calciner from said electrostatic precipitator;

i. product cooling means for cooling the calcined clay discharged from calciner, said product cooling means having an inlet for receiving the hot calcined clay from said calciner, an outlet for discharging cooled calcined clay, and a heat exchange chamber disposed therebetween wherein the calcined clay is passed in heat exchange relationship with a cooling medium thereby cooling the calcined clay and heating the cooling medium;

j. feed preheat means for preheating the clay to be calcined prior to feeding the clay to said calciner, said feed preheat means having an inlet for receiving the clay to be calcined, an outlet for discharging the preheated clay, and a heat exchange chamber disposed therebetween wherein the clay to be calcined is passed in heat exchange relationship with a heating medium thereby preheating the clay to be calcined and cooling the heating medium; and k. means for conveying the cooling medium through said product cooling means in heat exchange relationship with the hot calcined clay from said calciner and thence conveying the heated cooling medium discharged from said product cooling means to and through said feed preheat means as the heating medium in heat relationship with the clay to be calcined and thence conveying the cooled heating medium back to said product means as the cooling medium.

18. Apparatus for calcining a clay as recited in claim 17 wherein the means for recovering the clay particles removed from the gas discharged from said calciner comprises recycle means for transporting the clay particles removed from the gas discharged from said calciner from said electrostatic precipitator to said feed means without substantial cooling of the recycled clay particles during transport.

* * * * *